United States Patent [19]
Yates

[11] Patent Number: 6,094,894
[45] Date of Patent: Aug. 1, 2000

[54] ENVELOPE INSERTING APPARATUS

[75] Inventor: Keith Yates, Great Dunmow, United Kingdom

[73] Assignee: Pitney Bowes Inc., Stamford, Conn.

[21] Appl. No.: 09/134,641

[22] Filed: Aug. 14, 1998

[30]     Foreign Application Priority Data

Mar. 19, 1998 [GB] United Kingdom ............... 9805905

[51] Int. Cl.[7] .......................... B65B 57/06; B65B 57/18
[52] U.S. Cl. ............................... 53/505; 53/508; 53/569
[58] Field of Search ............................. 53/506, 505, 55, 53/53, 52, 508, 507, 69, 67, 64, 569, 206, 284.3, 460; 493/12, 10, 23, 27, 25, 8

[56]           References Cited

U.S. PATENT DOCUMENTS

| | | | |
|---|---|---|---|
| 4,020,615 | 5/1977 | Irvine et al. | 53/505 X |
| 4,733,359 | 3/1988 | Luperti et al. | 53/507 X |
| 4,955,186 | 9/1990 | Gough | 53/569 |
| 4,962,624 | 10/1990 | Foster et al. | 53/76 |
| 5,154,404 | 10/1992 | Orsinger et al. | 53/505 X |
| 5,327,701 | 7/1994 | Dronsfield | 53/569 X |

FOREIGN PATENT DOCUMENTS

0392867 A1  12/1990  United Kingdom.

*Primary Examiner*—James F. Coan
*Attorney, Agent, or Firm*—Christopher J. Capelli; Michael E. Melton

[57]           ABSTRACT

An inserter is disclosed having an insertion station and a feeding mechanism for feeding an envelope to the insertion station with the bottom edge of the envelope leading and the envelope flap in an open position and trailing, envelope opening mechanism at the insertion station and sheet feeding mechanism. A sensor detects the leading edge of the envelope as it is fed to the insertion station and, in response, causes the envelope opening mechanism to open the envelope after its arrival at the insertion station. The sensor also detects whether the envelope flap, when the envelope is waiting at the insertion station, is not in its open position and, when this is the case, it terminates operation of the envelope feeding mechanism and sheet feeding mechanism for the next envelope and sheet.

8 Claims, 6 Drawing Sheets

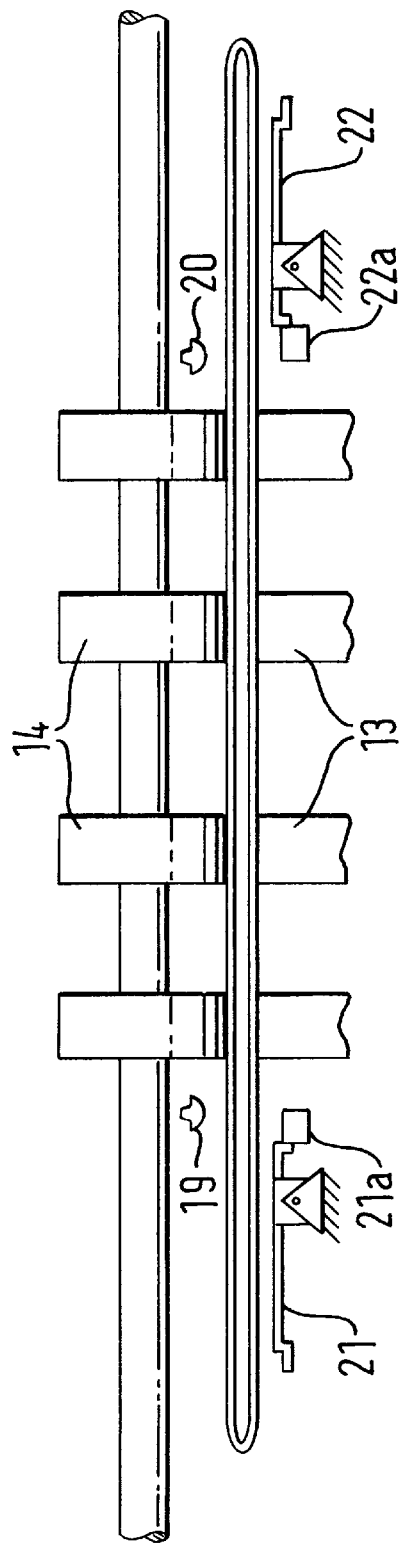
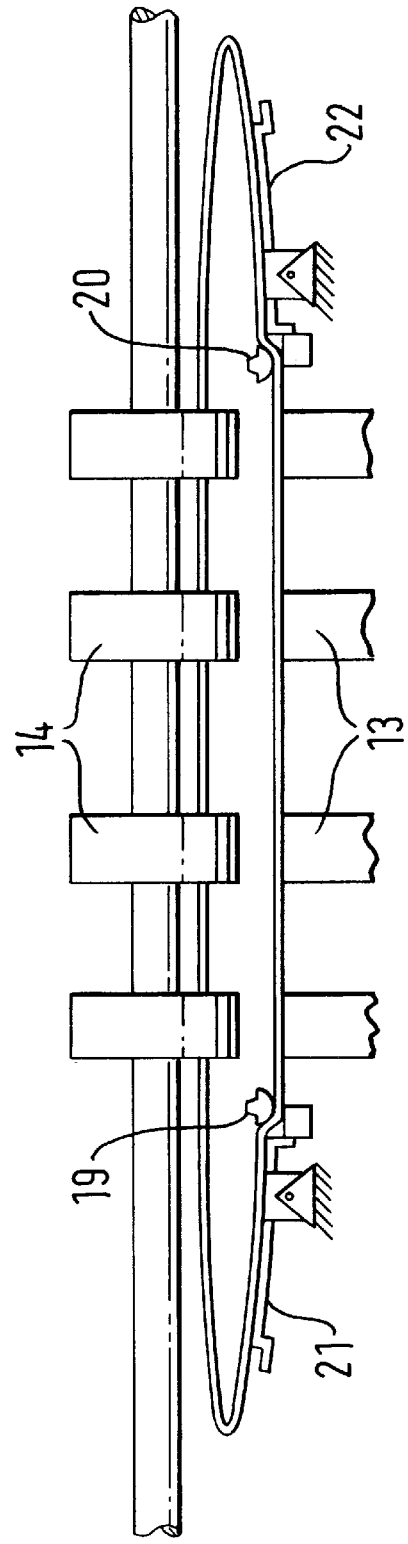

ENVELOPE INSERTING APPARATUS

FIELD OF THE INVENTION

The present invention relates to an inserter, and more particularly, to an envelope inserting apparatus in a document inserter for inserting documents into envelopes.

BACKGROUND OF THE INVENTION

Envelope inserting apparatus is well known and involves inserting paper documents into a waiting envelope that has had its front and rear panels spread apart to receive the insert material. In the inserting station, the envelope arrives first and is typically opened by a combination of devices which may include bending rolls and hold-down fingers. The contents to be inserted then arrive through a second path and are driven into the envelope. Typically, the last part of the inserting motion is accomplished ballistically for about 0.5° to 0.8° using the kinetic energy of the inserts. Reliability problems exist with this system because the envelope does not always open sufficiently, and, due to the bent nature of the envelope, drag is created on the insert material preventing it from reaching the bottom of the envelope.

Apparatus which positively opens the envelope and holds the envelope open, thereby greatly reducing the amount of drag on the insert material and assuring that the insert material is reliably inserted into the waiting envelope, is known from the present applicants' EP-A-0 785 092. In this apparatus, a waiting envelope is supported in a substantially horizontal plane with its back panel situated above its front panel and the envelope flap in its open position and substantially in the plane of the front panel. A pair of hold-down fingers presses the envelope flap from above against the inboard ends of respective pivotable paddles having an interior leg and exterior leg angled out of the plane of the interior leg, to cause the envelope to be arched over a bending roller and the envelope flap to be bowed downwardly. This causes the rear panel to "pop" upwardly. A pair of opening horns are moved between the front and rear panels of the envelope and then raised, thereby opening the envelope ready for an insert or insert collation to be inserted.

In this apparatus, the envelopes are stored with their flaps closed (unsealed) in an envelope supply station. Envelopes are successively withdrawn from this station, each envelope passing along an envelope feed path with its bottom edge leading, its top edge (forming the hinge between the envelope flap and the envelope front panel) trailing and its (closed) flap uppermost. As the envelope passes along the envelope feed path, a flap opening device engages with the envelope flap and bends it back into an open position so that the envelope arrives at the insertion station with its flap open, facing upwardly and trailing. The envelope is arrested at the insertion station and an envelope opening device opens or "throats" the envelope so that a single fed sheet or a collation of fed sheets and optionally one or more inserts can be driven into the waiting open envelope.

In practice, whilst known envelope flap opening devices are effective and reliable, occasionally the envelope flap is not opened for one reason or another. For example, the flap opening device may malfunction, the envelope may not be of appropriate quality, its flap may have previously become sealed due to moisture in the atmosphere or the like, or it may have been originally inserted in the envelope supply station in an incorrect orientation, any of which can then cause the flap opening device to malfunction. Any of these factors gives rise to the intended envelope contents being placed on top of the envelope at the insertion station, and then fed through to a mail collection bin at the exit of the inserter where the sealed envelopes are collected. For obvious reasons, any unstuffed envelope and its overlying contents need to be identified and removed from the stack of prepared envelopes. However, doing this by operator inspection is time-consuming, particularly if, to remedy the situation, the contents are then manually inserted into the envelope and the envelope sealed such as by the operator wetting the envelope flap and sealing it by hand. Furthermore, reliability cannot be certain. If an unstuffed envelope and its overlying contents are not identified and are then fed into a franking machine, they could cause a jam and the contents and the empty envelope would each be treated as a sealed filled envelope and both franked.

SUMMARY OF THE INVENTION

The present invention aims to provide an inserter which can identify an envelope at the insertion station whose flap has not been opened to receive the envelope contents and which can avoid time-consuming and inconvenient recovery operations.

According to the invention, there is provided an inserter having an insertion station and a mechanism for feeding a succession of envelopes, one at a time, to the insertion station with the bottom edge of the envelope leading and the envelope flap in an open position and trailing. Further included is an envelope opening mechanism positioned in the insertion station and a sensor arranged to detect the leading edge of the envelope as it is fed to the insertion station and, in response thereto, to cause the envelope opening mechanism to open the envelope after its arrival at the insertion station.

The inserter further includes a mechanism for feeding a respective document into each open envelope at the insertion station whereby the sensor is also arranged to detect whether the flap of the envelope, when at the insertion station, is not in its open position and, when this is the case, to stop operation of the envelope feeding means and document feeding means for the next envelope and document, respectively.

It will be appreciated that because operation of the envelope and document feeding mechanism is stopped for the next envelope and document, when the envelope flap has been detected as in its closed position at the insertion station, there is no possibility of an unstuffed envelope and overlying document being concealed within a stack of otherwise correctly prepared, sealed, envelopes collected at the exit from the inserter.

In a preferred embodiment, a transport mechanism is provided for transporting the envelope from the insertion station to an envelope collection apparatus, and the inserter is arranged, when the envelope flap is detected as not in its open position at the insertion station, to cease operation when the envelope arrives at the envelope collection apparatus. In this way, the envelope (and any overlying document associated with it) will be available for removal as the last items arriving at the envelope collection apparatus.

The inserter may further be provided with a visual and/or aural indicator device to produce a visual and/or aural warning to an operator, when the envelope flap is detected as not open at the insertion station.

Preferably, the first sensor is a mechanical-electrical sensor of which the mechanical part is arranged in the path of the envelope to the insertion station, to be actuated thereby. A mechanical-electrical sensor is preferred to the more common optical sensor, since it is less susceptible to the action of dust. It is particularly preferred that the sensor be in the form of a reed switch having a pivotally mounted actuating arm arranged on the envelope feed path.

The inserter may additionally be provided with a sealing mechanism, including an envelope flap moistener, on the transport mechanism of the inserter for sealing each envelope and the sensor may be arranged not to wipe the moistener when the envelope flap has been detected as not in its open position at the insertion station. This will prevent the envelope flap being sealed to the envelope back panel, or to the adjacent document or any adjacent stuffed envelope.

BRIEF DESCRIPTION OF THE DRAWINGS

For a better understanding of the invention and to show how the same may be carried into effect, reference will now be made, by way of example, to the accompanying drawings, in which:

FIGS. 4 and 5 are transverse sectional views in the region of the flippers and hold-down fingers used for throating an envelope and as seen when viewed in the direction towards the exit side of the inserter, respectively showing the envelope in its closed and open positions.

DETAILED DESCRIPTION OF A PREFERRED EMBODIMENT

Figure 1:
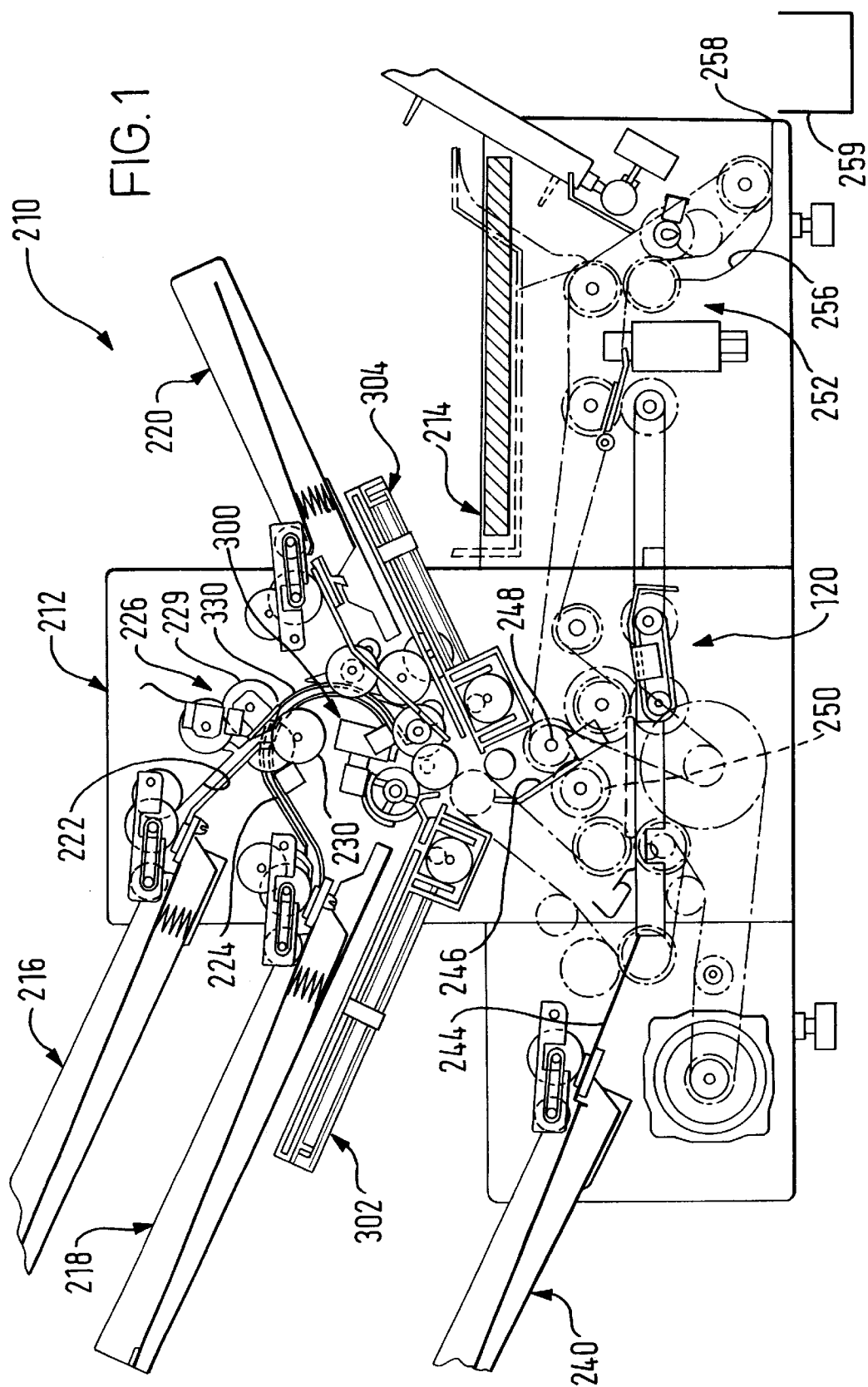
FIG. 1 is an elevational view of a document inserting system forming an embodiment of the present invention.

Reference is made to the drawings, wherein there is seen in FIG. 1 an elevational view of a tabletop inserter, designated generally at 210, forming an embodiment of the invention. A brief description will now be given.

With reference to FIG. 1, tabletop inserter 210 generally consists of an upper housing 212 mounted atop a lower housing 214. Upper housing 212 generally includes first and second sheet feeders 216 and 218, and preferably an insert feeder 220. Individual sheets are preferably conveyed from each sheet feeder 216 and 218 into respectively first and second feed paths 222 and 224. The first and second sheet paths 222 and 224 merge with one another at a collation station 226 having first and second collating rollers 229 and 230. The collating station 226 is operative to align the leading edges of first and second sheets being respectively conveyed from the first and second sheet feeders 216 and 218, via the first and second sheet paths 222 and 224, within the nip formed between the collating rollers 228 and 230. Once aligned, the collating rollers 228 and 229 are actuated to simultaneously feed the aligned sheets in a supply path 330 downstream of the collating station 226. These aligned sheets are also known as a "collation". This sheet collation is then conveyed downstream in the supply path 330 to the folding station 300.

Like conventional folding stations, the folding station is configured to fold the sheet collation in prescribed configurations, such as C-fold, Z-fold, Half-fold, Double-fold etc. In this constructional example, the folding station 300 comprises a first fold plate 302 and a second fold plate 304. It includes a diverter which is operable for diverting a sheet approaching the first fold plate 302 directly to the second fold plate 304. Depending on the setting of the diverter, the type of fold that is made can be selected. After a collation is folded in the folding station 300, the folded collation is then conveyed to the lower housing 214 of the inserter system 210 for further processing.

Figure 2:
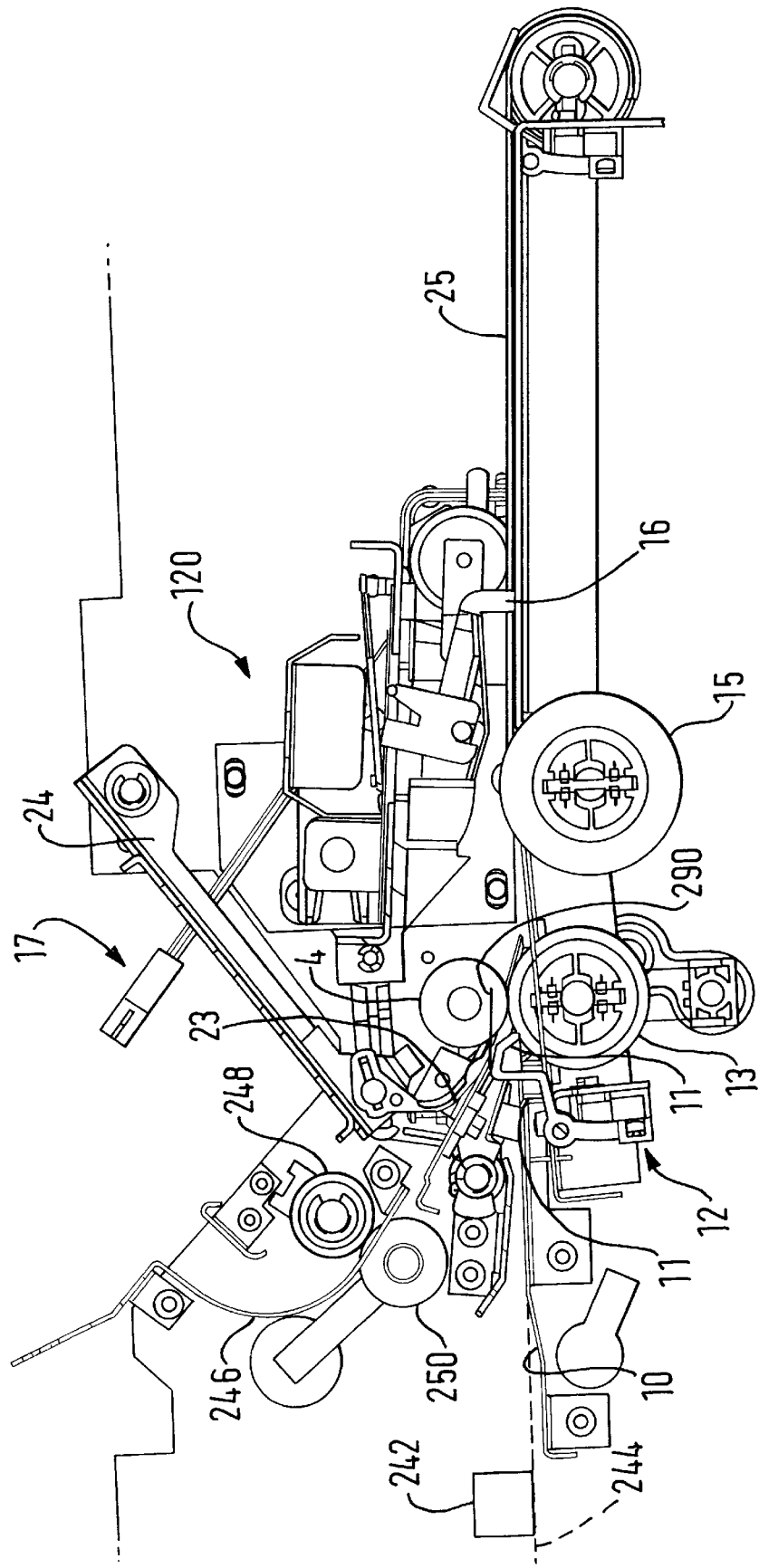
FIG. 2 is a side view of an insertion station in the inserter.

The lower housing 214 of inserter system 210 includes an envelope supply station 240 connecting to an insertion station 120. The envelope supply station 240 contains a supply of envelopes stored with their flaps in their closed (but unsealed) condition. These envelopes are fed to the insertion station 20, via envelope feed path 244 preferably. Each envelope flap is opened by a suitable flap opening device (shown very diagrammatically at 242 in FIG. 2) such as are well known in the art, while in transit on the envelope feed path from the envelope supply station to the insertion station. Once received in the insertion station 20, the envelope has its mouth opened in preparation for insertion of the aforesaid folded collation being conveyed from the folding station 300. Thus, the folded collation is transported from the folding station 300 to the insertion station 20, via a collation transport path 246 connecting the latter two stations. Preferably the collation transport path 246 includes a pair of conveying rollers 248 and 250 for conveying a folded collation along the transport path 246.

The lower housing 214 further includes a sealing station 252 located downstream of the insertion station 20, which sealing station 252 is operative to seal an open envelope received from the insertion station 20. An envelope insertion path connects the insertion station 20 to the sealing station 252. An envelope output path 256 connected to the sealing station 252 is operative to convey sealed envelopes from the sealing station 252 through an output opening 258 provided in the lower housing 214 of the insertion system 210. After a sealed envelope has exited from the output opening 258, appropriate postage can then be applied for delivery to a recipient.

As is conventional, inserter system 210 includes a control system (not shown in FIG. 1) for controlling the various components implemented in the inserter system. It is to be appreciated that the control system is to encompass a computer processor driven system. A certain part of the control system to be described below is disclosed in FIG. 6.

With the general structure of inserter system 210 being described above, a more specific description will now be given with particular reference to the insertion station 120.

Figure 1A:
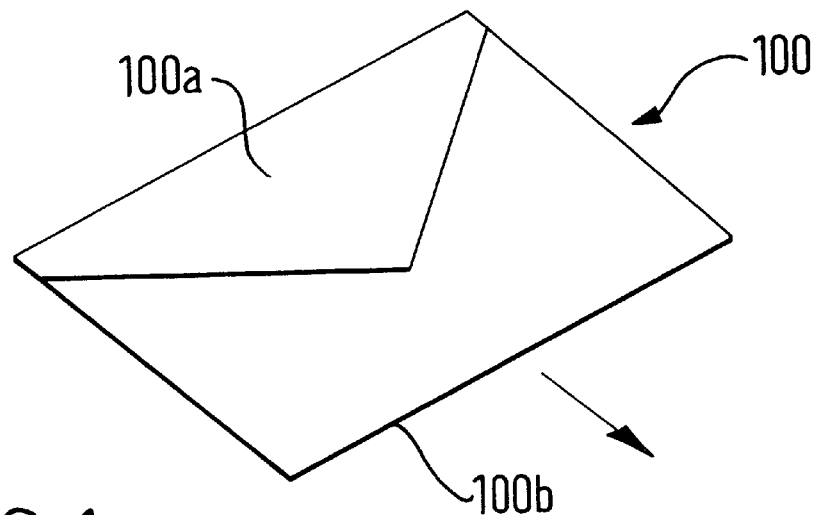
FIGS. 1A and 1B show an envelope as fed from the envelope supply station and an envelope with its flap open as it approaches the insertion station, respectively.
Figure 1B:
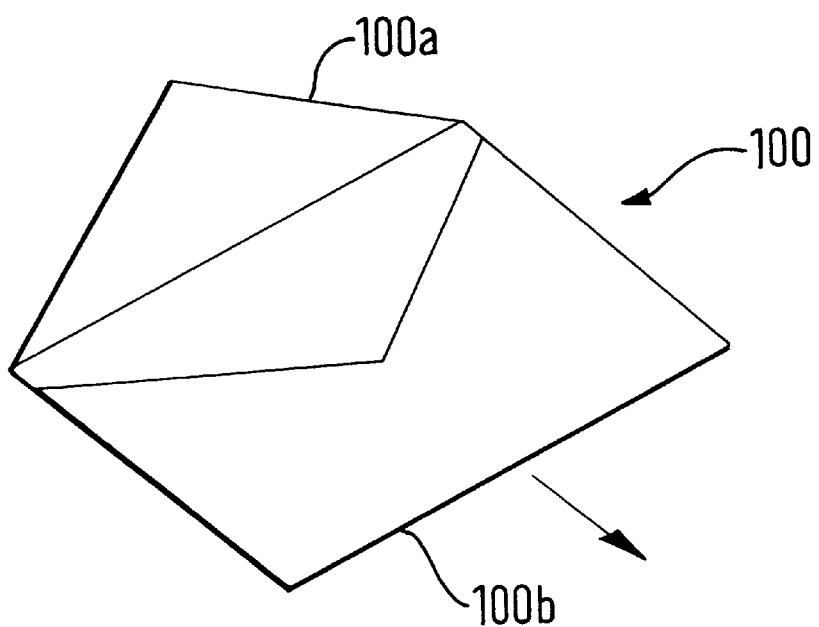

As shown in FIG. 1A, each envelope is fed from the envelope supply station 240 with its flap 100a in the closed, but unsealed, position, with the flap on the upper (rear) side of envelope and its bottom edge 100b leading. The flap opening device 242 on the envelope feed path 244 (see FIG. 2) causes the flap 100a to hinge rearwardly to assume the open position shown in FIG. 1B, in which the flap faces upwardly. Conveniently, the flap opening device can be of a particular known type which is arranged to cause the envelope to arch from front to back, tending to cause the back (uppermost) panel to arch upwardly and push the envelope flap up slightly. In addition, the leading edge of the envelope is arranged to strike a lever of the flap opening device, which rotates a blade under the flap. As the envelope continues to travel along the envelope feed path, the blade pivots the flap rearwardly until it resumes a trailing position.

The envelope is transported further by drive and driven rollers (not shown in FIG. 2) on the upper surface of support plate 10 until the leading edge strikes the pivotally mounted actuating arm 11 of a reed switch 12, which causes the arm to pivot downwardly, actuate the switch and allow the leading edge of the envelope to pass into the nip of drive/driven roller pair 14, 13 which then drives the envelope further across the upper surface of a bending roll 15 of a conveyor 25, until the envelope bottom edge is arrested by a downwardly depending, stop 16. The function of reed switch 12 is described later.

Before a collation of folded sheets, optionally with one or more inserts, can be delivered along collation transport path 246 into the envelope waiting at the insertion station, it has to be opened by a suitable envelope opening device 17. The construction and operation of this opening device does not form part of the invention and can take the form of that disclosed in the present Applicants' EP-A-0 785 093 or the present Applicants' co-pending application(reference P12772), filed on the same day as the present case, to which reference is hereby directed. However, a brief description of the latter form of envelope opening device will now be described.

Figure 3:
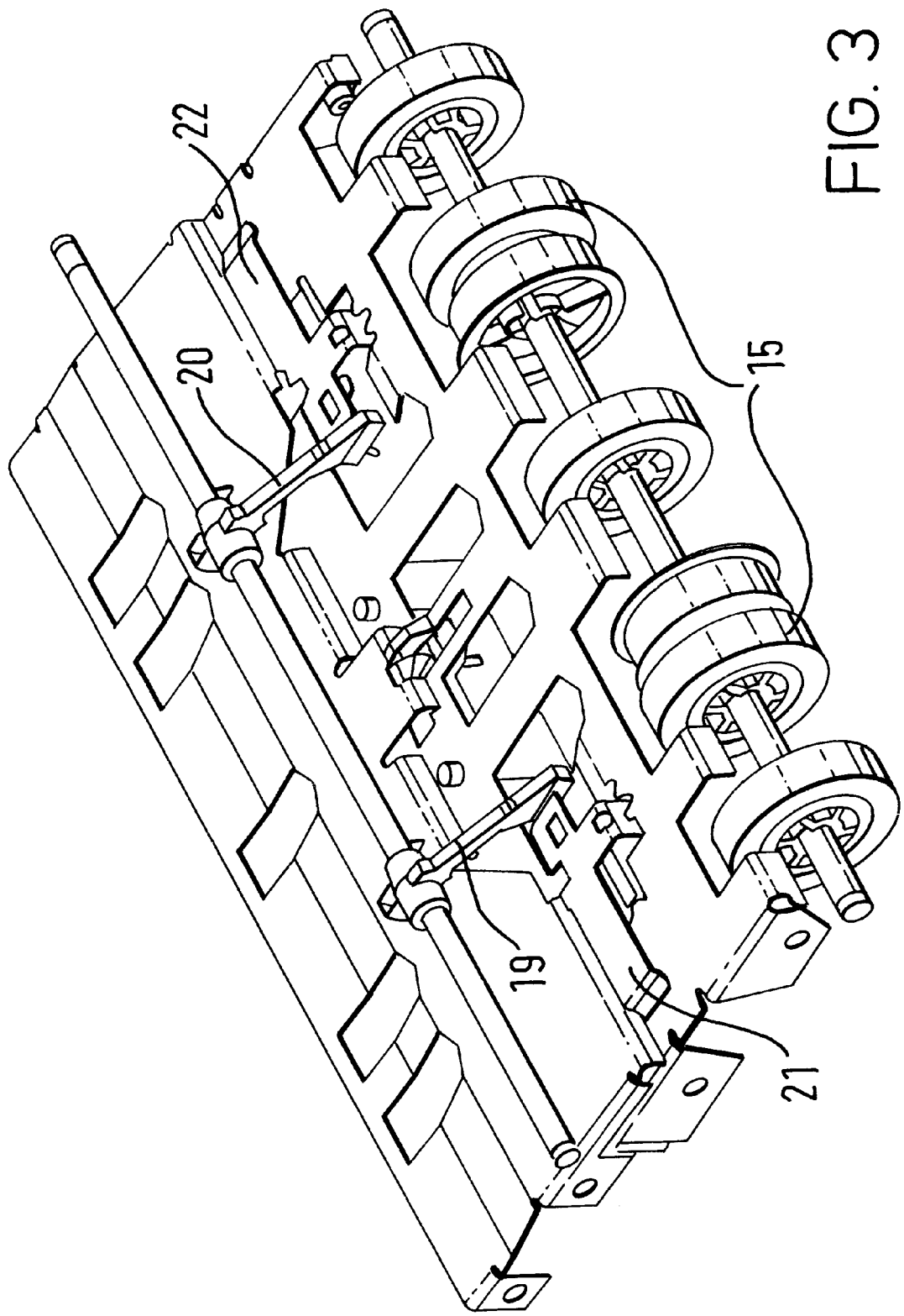
FIG. 3 is a perspective view showing a pair of hold-down fingers under a pair of flippers that co-operate to pucker an envelope at the insertion station, thereby causing it to open ready to receive a collation of documents.

The bending roll 15 is rotatably mounted in the lower housing 214 of the inserter. Driven roll 13 is displaceable between raised and lowered positions. While the envelope is being fed to the insertion station against the stop 16, roll 13 is held in its raised position conveying the envelope between the driven and drive rolls 13, 14. As shown in FIGS. 3 and 4, a pair of hold-down fingers 19, 20, are in a raised position to allow the envelope to pass thereunder and a pair of pivotally mounted flippers 21, 22 are in a position where their interior ends respectively are raised With the envelope in its waiting position at the insertion station 120, roll 13 is withdrawn downwardly and then, the hold-down fingers are rotated downwardly, from the position shown in FIG. 4 to the position shown in FIG. 5, whereupon, with assistance from a stepped portion 21a, 22a at the inner end of the flippers, the envelope is puckered, causing the rear panel (positioned uppermost) to "pop" open, assisted by the arching of the front (downwardly facing) panel of the envelope caused by the hold-down FIGS. 19, 20 arching the envelope over the bending roll 15.

Additional separation of the envelope panels is effected by a pair of opening horns 23 which are mounted on pivotal arm 24, which pivots the horns through the open mouth of the envelope, while a camming arrangement causes the horns to be raised. In this way, the rear (upper most) panel of the waiting envelope is fully opened waiting to receive the collation being fed along the collation transport path 246 to the conveying rollers 248, 250, and from there they are driven into the open envelope by the roller 14, a leaf spring 290 urging the envelope from below against the drive roller 14.

Once the envelope has been filled, the stop 16 is raised vertically. At the same time, both the hold-down fingers and the lower roller 13 are raised to release the stuffed envelope, which is transported from the insertion station along the conveyor 25 to exit the inserter into a collection bin or the like, diagrammatically shown at 259 in FIG. 1.

It will be self apparent that in order to maximise the throughput of the inserter, it is critical that the collation arrives at the insertion station as soon as possible after the opening of the envelope has been completed. This result is achieved by providing a first sensor 50 (see FIG. 6) which is positioned alongside the feedpath 244, between the envelope feeding station and flap opening device 242, to detect the feeding of an envelope from the envelope feeding station along the envelope feed path 244 and initiate the feeding of sheets from the sheet feeders 216, 218. The instant at which the feeding of sheets from the sheet feeders is initiated is timed such that after they have been collated, folded, and optionally combined with one or more inserts, they will arrive at the insertion station just as the envelope is fully opened. Depending upon the design considerations and operating parameters of the inserter, the sheets will be fed at the same time as the envelope feeding is detected or at a predetermined time thereafter.

Figure 6:
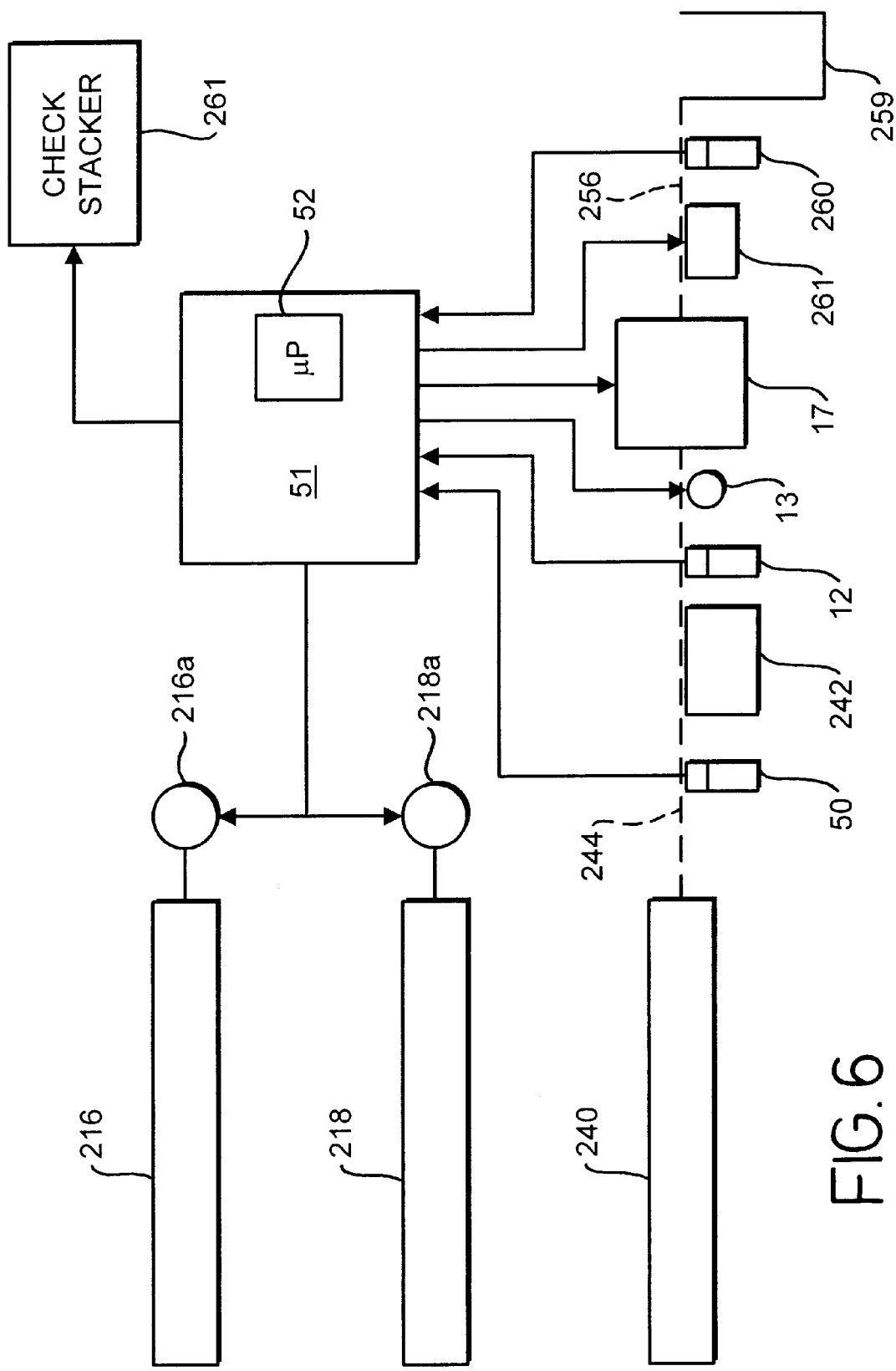
FIG. 6 shows a central system for the inserter.

FIG. 6 very diagrammatically shows a control system for the inserter. As shown in the figure, a controller system 51, which conveniently may incorporate microprocessor control 52, responds to the sensor 50 detecting the feeding of an envelope and accordingly at the same time, or after the elapse of a predetermined time, initiates the application of drive to feed rollers 216a, 218a, respectively associated with the sheet feeding stations 216, 218.

When the leading edge of the fed envelope, whose flap has been opened by opening device 242, strikes the pivotal arm 24, the arm pivots downwardly below the envelope feed path while actuating the switch 12, this switch 12 changing its output state. In response, the controller 51 (see FIG. 6) sends a signal to disengage drive from the roller pair 13, 14 by withdrawing the roll 13 downwardly and initiates operation of the envelope opening device 17 with appropriate timing. Although drive is disengaged from the roller pair 13, 14, the momentum of the envelope brings the envelope into abutment with stop 16, which arrests the envelope at the insertion station. The envelope is then opened by opening device 17, ready to receive the prepared collation.

It will be understood that the mode of operation described above relies on the assumption that the flap opening device 242 will consistently open the flap of the supply envelope. However, in practice, 100% reliable operation may not occur. Occasionally, for reasons such as malfunction of the flap opening device 242, the envelope flap already being sealed, the envelope having been stored in the envelope supply station upside down, or the envelope being of different quality, an envelope may arrive at the insertion station with its flap not in the open position, facing upwards. It may for example be closed. The envelope opening device 17 will be unable to open the envelope and the arriving collation will not be inserted into the envelope. Instead, the collation will be brought to rest at the insertion station, overlying the envelope. If the inserter were to continue to operate, the envelope and its collation would be conveyed together, one on top of the other, to the collection bin at the exit of the inserter. Therefore, the envelope and its overlying collation would form successive items in a stack of otherwise properly sealed and closed envelopes. In this case, their presence would need to be detected by operator inspection and the collation inserted into an envelope, before postage could be applied and the prepared envelope mailed out.

To solve this problem, the control system operates as follows. A predetermined time after the reed switch is tripped by envelope leading edge detection, this time interval being larger than the time required for the envelope to come to rest at the insertion station, the output state of the reed switch 12 is again checked, to see whether it is still in its switched state or not. The reed switch is so located that if the envelope flap is open as should be the case, the flap will keep the operating arm 11 depressed and the control system 51 will recognise this condition to allow the inserter to complete the insertion, sealing and envelope collection operations of the cycle, and then start the next cycle for the next envelope.

However, in the event that the envelope flap, for whatever reason, is not in its open position when the envelope arrives at the insertion station, the reed switch 12 will return to its original operating position in which the operating arm 11 is positioned so as to be in the path of the envelope that is next to be fed. The controller 51 is arranged to respond to this output state of the reed switch, to output instructions to halt operation of the inserter in a suitable way. Preferably, it waits to the end of its operating cycle and then stops the inserter. For example, a detector 260 could be used to detect the envelope and its overlying envelope leaving the output path 256 and entering the collection bin, whereupon the inserter stops. This would leave the envelope and its overlying collation on top of the stack in the collection bin, to be dealt with by the operator in an appropriate way. Alternatively, it could just stop the operation of the inserter immediately on detection of the envelope flap in its closed position, though then the envelope and the collation would both need to be removed from within the inserter, such as by partial dismantling or by gaining access to the interior of the inserter by opening a suitable jam clearance mechanism. In either case, because the controller stops feeding of any firther sheets, inserts or collations, or any further envelopes until the unstuffed envelope and its collation have been removed and the operator restarted the inserter, there is no risk of their being concealed within a stack of sealed prepared envelopes in the collection bin.

It will be appreciated that the advantage of this arrangement is that further operation of the inserter can be prevented and the operator can then take appropriate corrective action.

Optionally in addition, a visual and/or aural indicator device 261 may be provided which produces a visual or aural indication to the operator in the event that the envelope flap is detected as being closed. A suitable visual warning would read "check stacker", or the like, which would be a reference to the need to inspect the collection bin.

It is particularly preferred that a reed switch be used for the described leading edge and envelope flap detections. This is because a reed switch is generally very reliable in operation and, furthermore, it is not susceptible to malfunction caused by the presence of dust, whereas an optical sensor can be.

In a preferred arrangement, when an envelope is detected at the insertion station as not with an open flap, the controller 51 is arranged not to wipe a moistener 261 of the sealing station 252, which would otherwise moisten the gummed envelope flap so that it would be sealed by the sealing station.

Whilst reference is made hereinabove to stuffing an envelope with a collation, it will be appreciated that the inserter is versatile in operation and can be set so as to feed a single sheet, or a plurality of sheets, with or without folding, in each case with or without one or more inserts. Alternatively, the inserter can be used to place other documents, such as an insert or plurality of inserts only, within the envelope.

Although the disclosed inserter positions the envelope at the insertion station with its rear panel uppermost and flap directed upwardly, it is not critical that the envelope be orientated in this way. It could for example face in the opposite direction, i.e. downwardly, though this would complicate the arrangement of the flow paths and internal components of the inserter to some extent.

What is claimed is:

1. An inserter comprising:
    an insertion station;
    means for feeding a succession of envelopes, one at a time, to the insertion station with the bottom edge of the envelope leading and the envelope flap in an open position and trailing;
    envelope opening means at the insertion station;
    a sensor arranged to detect the leading edge of the envelope as it is fed to the insertion station and, in response thereto, to cause the envelope opening means to open the envelope after its arrival at the insertion station; and
    means for feeding a respective document into each open envelope at the insertion station wherein the sensor being also arranged to detect whether the flap of the envelope, when at the insertion station, is not in its open position and, when this is the case, to stop operation of the envelope feeding means and document feeding means for the next envelope and document, respectively.

2. An inserter according to claim 1, wherein transport means are provided for transporting the envelope from the insertion station to an envelope collection means, and the inserter is arranged, when the envelope flap is detected as not in its open position at the insertion station, to cease operation when the envelope arrives at the envelope collection means.

3. An inserter according to claim 1, wherein a visual and/or aural-indicator device is provided to produce a visual and/or aural warning, when the operation of the envelope feeding means and document feeding means stops.

4. An inserter according to claim 2, wherein a visual and/or aural indicator device is provided to produce a visual and/or aural warning, when the operation of the inserter stops.

5. An inserter according to claim 4, wherein the sensor is a mecanical-electrical sensor of which the mechanical part is arranged in the path of the envelope to the insertion station, to be actuated thereby.

6. An inserter according to claim 5, wherein the mechanical-electrical sensor is a reed switch comprising a pivotally mounted actuating arm arranged on the envelope feed path.

7. An inserter according to claim 2, wherein sealing means, including an envelope flap moistener, is provided on said transport means for sealing each envelope and the sensor is arranged not to wipe the moistener when the envelope flap is detected as not in its open position at the insertion station.

8. An inserter according to claim 2, wherein the arrangement is such as to receive the envelope at the insertion station with the envelope flap facing upwardly.

\* \* \* \* \*